United States Patent [19]

Hamada et al.

[11] 4,110,526
[45] Aug. 29, 1978

[54] METHOD FOR PRODUCTION OF CASTING SYRUPS

[75] Inventors: Takaki Hamada; Hiroyuki Kanazawa; Masataka Yanase, all of Niihama, Japan

[73] Assignee: Sumitomo Chemical Company, Limited, Japan

[21] Appl. No.: 764,021

[22] Filed: Jan. 31, 1977

[30] Foreign Application Priority Data

Feb. 6, 1976 [JP] Japan .................. 51-12713

[51] Int. Cl.² ............................. C08F 20/14
[52] U.S. Cl. ............................. 526/214; 260/45.85 S; 526/329; 526/329.2; 526/329.3; 526/329.7
[58] Field of Search ............... 260/45.85 H, 45.85 S; 526/214, 328, 329, 329.7

[56] References Cited

U.S. PATENT DOCUMENTS

| | | | |
|---|---|---|---|
| 3,392,157 | 7/1968 | Izumi et al. | 260/45.85 S |
| 3,474,081 | 10/1969 | Bosworth | 526/328 |
| 3,759,881 | 9/1973 | Holder | 526/328 |
| 3,801,541 | 4/1974 | Hofmann | 260/45.85 S |
| 3,950,314 | 4/1976 | Graff | 526/214 |
| 3,957,905 | 5/1976 | Sumoto et al. | 260/45.85 H |
| 3,966,675 | 6/1976 | Schurdak | 260/45.85 H |

OTHER PUBLICATIONS

Nakazuka et al., Chem. Abs. 77 (1972) p. 140970f.
Imura et al., Chem. Abs. 81 (1974) p. 14786v.

Primary Examiner—Harry Wong, Jr.
Attorney, Agent, or Firm—Birch, Stewart, Kolasch and Birch

[57] ABSTRACT

In the production of a casting syrup, useful in a continuous casting process for manufacture of cast plates, by partial polymerization of methyl methacrylate or its mixture with at least one unsaturated vinyl compound copolymerizable therewith in an amount of not more than about 20% by weight based on methyl methacrylate, an improved method wherein the partial polymerization is carried out in the presence of a thiodicarboxylic acid ester of the formula:

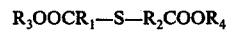

$$R_3OOCR_1-S-R_2COOR_4$$

wherein $R_1$ and $R_2$ are each an alkylene group having 1 to 6 carbon atoms and $R_3$ and $R_4$ are each an alkyl group having 1 to 24 carbon atoms as a stabilizer using an azo compound as a polymerization initiator, whereby a casting syrup having a suitable viscosity with a good workability on casting and affording a cast plate of high thermal stability on completion of the polymerization is obtainable.

9 Claims, No Drawings

METHOD FOR PRODUCTION OF CASTING SYRUPS

The present invention relates to a method for production of casting syrups, useful in the continuous casting process for manufacture of cast plates of methyl methacrylate polymer, which have a suitable viscosity for handling and a high polymer content and can yield cast plates of high thermal stability therefrom within a short period of polymerization time.

In general, a cast plate of methyl methacrylate polymer is superior in various properties, for example, flatness of surface, appearances such as transparency or color, mechanical properties, thermal properties, resistance to weathering and the like. Therefore, the cast plate is now in a wide use as a thermoplastic resin plate.

However, a methyl methacrylate cast plate produced by continuous casting polymerization of methyl methacrylate which has been developed in recent years and attains a high productivity with a high speed is inferior in the thermal stability to a cast plate of methyl methacrylate polymer produced by cell casting which has been conventionally adopted commercial purposes, when exposed to relatively high temperatures (i.e. from about 150° to 200° C), for example, on molding or fabricating. Thus, the polymer of methyl methacrylate once produced by continuous casting polymerization partially decomposes, and the resulting degradation monomers and low molecular compounds foam in the molded or fabricated products to impart a remarkable damage in the appearance of the products or to decrease the thermal and mechanical properties of the products. Therefore, the range of applicable temperatures for molding or fabricating the cast plate disadvantageously becomes narrow.

Various methods for preventing the said deterioration by heat have been proposed. One of the typical methods is the incorporation of a stabilizer such as a decomposition-inhibitor. As the stabilizer, amine compounds and phenol compounds are well known. However, these stabilizers can hardly be used in the case of the polymerization of methyl methacrylate because the cast polymerization time is prolonged and, in addition, in case of the polymer of methyl methacrylate having excellent optical properties, because the polymer incorporated with them is colored on heating and deteiorated in weatherability, transparency and color. Another typical method is the incorporation of sulfur-containing compounds as a thermal stabilizer [cf. Japanese Patent Publication Nos. 13383/1968 and 35977/1971], if necessary, with phenol compounds [cf. Japanese Patent Publication Nos. 1498/1968 and 7629/1972]. But, a satisfactory result has not yet been obtained.

As the result of an extensive study, it has now been found that a cast plate of methyl methacrylate polymer having an excellent thermal stability, and particularly not producing any foam or coloring on heating, can be manufactured by the continuous casting polymerization of a casting syrup prepared by partial polymerization of methyl methacrylate in the presence of a certain specific stabilizer and a certain specific polymerization initiator.

According to the present invention, there is provided a method for production of a casting syrup, utilizable advantageously for manufacture of cast plates of methyl methacrylate polymer by a continuous casting process, which comprises the step of partial polymerization of methyl methacrylate or its mixture with at least one unsaturated vinyl compound copolymerizable therewith in an amount of not more than about 20% by weight based on methyl methacrylate in the presence of a thiodicarboxylic acid ester of the formula:

$$R_3OOCR_1-S-R_2COOR_4 \qquad (I)$$

wherein $R_1$ and $R_2$ are each an alkylene group having 1 to 6 carbon atoms and $R_3$ and $R_4$ are each an alkyl group having 1 to 24 carbon atoms as a stabilizer using an azo compound as a polymerization initiator.

As the starting monomer(s) for production of the casting syrup, there may be used methyl methacrylate alone or a mixture of methyl methacrylate with at least one unsaturated vinyl compound copolymerizable therewith in an amount of not more than about 20% by weight based on the total monomers. Examples of the unsaturated vinyl compound are alkyl acrylates (e.g. methyl acrylate, ethyl acrylate, butyl acrylate), alkyl methacrylates (e.g. ethyl methacrylate, lauryl methacrylate), unsaturated nitriles (e.g. acrylonitrile, methacrylonitrile), styrenes, etc., which are conventionally employed for the production of methyl methacrylate resins.

The stabilizer to be used in the method of this invention is the thiodicarboxylic acid ester of the formula (I) wherein $R_1$ and $R_2$ may be each methylene, ethylene, propylene, etc. and $R_3$ and $R_4$ may be each decyl, dodecyl, tetradecyl, hexadecyl, octadecyl, etc. Specific examples of the thiodicarboxylic acid ester (I) include dilauryl thiodipropionate, distearyl thiodipropionate, lauryl stearyl thiodipropionate, etc. These stabilizers may be used in an amount of about 0.005 to 1.0% by weight, preferably about 0.01 to 0.2% by weight, based on the total amount of the starting monomer(s).

There are known some sulfur-containing compounds which are useful as a stabilizer for methyl methacrylate resins. However, those known sulfur-containing compounds can not impart a sufficient thermal stability to cast plates of methyl methacrylate polymer. Thus, the use of the thiodicarboxylic acid ester (I) is essential in the present invention. If, however, the thiodicarboxylic acid ester (I) is incorporated into the produced casting syrup, and not used in the partial polymerization for production of the casting syrup, a satisfactory heat resistance is not achieved.

The polymerization initiator usable in the method of the invention is an azo compound, which is known as an azo type polymerization initiator. Specific examples of the azo compound are 2,2'-azobis(isobutyronitrile), 2,2'-azobis(2,4-dimethylvaleronitrile), 1,1'-azobis(1-cyclooctanecarbonitrile), 2,2'-azobis(2-cyclopropylpropionitrile), 2,2'-azobis(4-methoxy-2,4-dimethylvaleronitrile), etc. These polymerization initiators may be employed in an amount of about 0.001 to 1.0% by weight based on the total amount of the starting monomer(s).

As the polymerization initiator for methyl methacrylate or its mixture with other monomers, there are known some other compounds in addition to the azo compounds. Representatives of the other compounds are organic peroxides such as lauroyl peroxide and bis(4-t-butylcyclohexyl) peroxydicarbonate. In the method of this invention, however, such other compounds are not usable since satisfactory heat resistance is not imparted or unfavorable effects are produced.

The partial polymerization for the production of the casting syrup may be carried out usually at a temperature of from about 60° to 200° C, preferably from about 80° to 180° C. The partial polymerization time may be easily determined in consideration of the viscosity and polymer content of the syrup to be used in the casting polymerization. It is desirable to properly determine the polymerization temperature depending upon the decomposition temperature of the azo compound used as the polymerization initiator. The introduction of the polymerization initiator into the reaction system is usually made after heating the starting monomer(s) to a desired temperature. The stabilizer may be added to the reaction system prior to or after heating the starting monomer(s) to the desired temperature, but it is preferred to add it prior to heating.

The production of the casting syrup may be effected batchwise or continuously. When continuously effected, a mixture comprising the starting monomer(s), the stabilizer and the polymerization initiator may be continuously fed to a reactor (e.g. tank reactor, tube reactor) so as to achieve the partial polymerization successively.

By the method of the present invention, there can be produced a casting syrup having a comparatively low viscosity (usually from about 1 to 100 poise) and a relatively high polymer content (usually from about 10 to 40% by weight). Because of this reason, the production of a cast plate can be accomplished with a good operation efficiency in a short period of cast polymerization time.

For the manufacture of the cast plate with the casting syrup of the invention, there may be adopted a conventional continuous casting process using a pair of upper and lower endless belts. Upon casting, the said azo type polymerization initiator may be additionally incorporated into the casting syrup. Also, the said thiodicarboxylic acid ester (I) or any other heat stabilizer may be added to the syrup. Moreover, other additives such as surface active agents, pigments, dyes, ultraviolet light absorbers, plasticizers, mold release agents, crosslinking agents and glass fibers may be added to the syrup, when desired.

Due to the presence of the thiodicarboxylic acid ester (I) as the stabilizer, the casting syrup is highly resistant to heat so that no coloring is produced in the resulting cast plate. Further, the cast plate shows a notable resistance to heat because of the inclusion of such stabilizer.

The present invention will be illustrated specifically with reference to the following examples. These examples are only given for the purpose of illustration, and the scope of the present invention is not limited thereto. Further, these examples may be modified properly within the scope of the present invention.

All the parts and percentages in the examples are by weight.

EXAMPLE 1

A mixture of 100 parts of methyl methacrylate and 0.1 part of dilauryl thiodipropionate was charged in a polymerization reactor equipped with a reflux condenser, a nitrogen-introducing tube, a thermometer and a stirrer. The mixture was heated to 90° C with stirring under a nitrogen atmosphere, and 0.08 part of 2,2'-azobis(2,4-dimethylvaleronitrile) was added thereto. Immediately, the increase of temperature caused by polymerization heat started, and after 2 minutes the refluxing was observed. The reaction mixture was kept at 100° to 102° C under reflux for 8 minutes. Thereafter, the reactor was immediately chilled to cool the syrup in the reactor below 20° C. The syrup thus obtained had a polymer content of 24.3% and a vicosity of 17 poises (measured at 25° C).

Into 100 parts of the above obtained syrup, 0.06 part of 2,2'-azobis(2,4-dimethylvaleronitrile) was dissolved, and the resulting solution was deaerated under reduced pressure. A pair of endless belts made of mirror-polished stainless steel of 500 mm in width and 0.6 mm in thickness were arranged with one over the other (the distance in the mechanical direction, 10,000 mm). This continuous casting equipment was adjusted so that the cast plates as ultimately produced had a thickness of 3 mm. The above deaerated syrup was continuously charged in the equipment and heated with warm water of 85° C for polymerization. After the generation of polymerization heat passed over the peak, the resulting cast plate was treated for 10 minutes with hot air of 120° C. Thereafter, the plate was cooled to room temperature to obtain a colorless, transparent, foamless cast plate. This cast plate had a reduced viscosity of 2.2 dl/g which was determined on the chloroform solution (0.1 g/100 ml) at 25° C.

For measurement of the heat resistance of the cast plate thus obtained, the plate was heated in a hot air circulation oven for 30 minutes at a definite temperature, and the lowest temperature at which the plate began to foam was measured. The test results are shown in Table 1.

In Table 1, there are also shown the heat resistance of the cast plate (Reference Example 1) prepared in the same manner as in Example 1 except that dilauryl thiodipropionate was not added on the production of the syrup (which had a polymer content of 24.5% and a viscosity of 20 poises (at 25° C)) and of the cast plate (Reference Example 2) prepared in the same manner as in Reference Example 1 except that 0.1 part of dilauryl thiodipropionate was added to the syrup obtained in Reference Example 1 upon casting.

Table 1

|  | Example 1 | Reference Example 1 | Reference Example 2 |
|---|---|---|---|
| Foaming temperature (° C) | 190 | 160 | 165 |

It is apparent from the above results that the heat resistance of the cast plate is remarkably improved by the addition of dilauryl thiodipropionate on the production of the syrup.

EXAMPLE 2

In the same manner as in Example 1 except that the amounts of 2,2'-azobis(2,4-dimethylvaleronitrile) and dilauryl thiodipropionate were respectively 0.025 part and 0.05 part, there was produced a syrup having a polymer content of 14.8% and a viscosity of 4.3 poises (at 25° C).

To 100 parts of the above obtained syrup, 0.1 part of 2,2'-azobis(isobutyronitrile) was added, and a cast plate was produced in the same manner as in Example 1.

The resulting cast plate was tested for heat resistance in the same manner as in Example 1. Further, the heat distortion temperature was measured on the cast plates before and after heating at 170° C for 30 minutes in a hot air circulation oven (according to ASTM D 648-56). The test results are shown in Table 2.

In Table 2, there are also shown the test results on the cast plate (Reference Example 3) produced in the same manner as in Example 2 except that dilauryl thiodipropionate was not added on the production of the syrup (which had a polymer content of 14.9% and a viscosity of 4.5 poises (at 25° C)), the cast plate (Reference Example 4) produced in the same manner as in Reference Example 3 except that 0.05 part of dilauryl thiodipropionate was added to the syrup obtained in Reference Example 3 upon casting and the cast plate (Reference Example 5) produced in the same manner as in Example 2 except that 0.035 part of bis(4-t-butylcyclohexyl)-peroxydicarbonate was used in place of 2,2'-azobis(2,4-dimethylvaleronitrile) on the production of the syrup (which has a polymer content of 14.2% and a viscosity of 3.8 poises (at 25° C)).

Table 2

| | Foaming temperature (° C) | Heat distortion temperature | |
| --- | --- | --- | --- |
| | | Before heating (° C) | After heating (° C) |
| Example 2 | 200 | 106 | 103 |
| Reference Example 3 | 170 | 106 | 94 |
| Reference Example 4 | 180 | 106 | 98 |
| Reference Example 5 | 170 | 90 | — |

It is apparent from the above results that the addition of dilauryl thiodipropionate and the azo type polymerization initiator on the production of the syrup is very effective for the rise of the foaming temperature and heat distortion temperature of the cast plate for the remarkable improvement of the heat resistance of the cast plate.

EXAMPLE 3

In the same manner as in Example 1 except that 0.1 part of distearyl thiodipropionate was used in place of dilauryl thiodipropionate, there was produced a syrup having a polymer content of 24.1% and a viscosity of 15 poises (at 25° C). Using this syrup, a cast plate was also produced in the same manner as in Example 1. The foaming temperature of the cast plate was 190° C.

For comparison, a cast plate was produced in the same manner as in Reference Example 2 except that 0.1 part of distearyl thiodipropionate was used in place of dilauryl thiodipropionate. The foaming temperature of the cast plate was 165° C.

EXAMPLE 4

In the same manner as in Example 2 except that 0.1 part of 2,2'-azobis(4-methoxy-2,4-dimethylvaleronitrile) was used in place of 2,2'-azobis(2,42,4-dimethylvaleronitrile), there was produced a syrup having a polymer content of 15.5% and a viscosity of 7.3 poises (at 25° C). Using this syrup, a cast plate was also produced in the same manner as in Example 2. The foaming temperature of the cast plate was 200° C.

For comparison, a syrup was produced in the same manner as in Example 4 except that dilauryl thiodipropionate was not used. The syrup thus obtained had a polymer content of 15.7% and a viscosity of 7.6 poises (at 25° C). A cast plate was produced in the same manner as in Example 2 using this syrup. The foaming temperature of the cast plate was 170° C. There was also produced a cast plate using the said syrup and with addition of 0.05 part of dilauryl thiodipropionate upon casting. The foaming temperature of the cast plate was 180° C.

What is claimed is:

1. In the production of a casting syrup, useful in a continuous casting process for the production of cast plates, by partial polymerization of methyl methacrylate or a mixture thereof with at least one unsaturated vinyl compound copolymerizable therewith in an amount of less than 20% by weight based upon methyl methacrylate, the improvement which comprises conducting the partial polymerization in the presence of from about 0.005 to 1% by weight based on the total amount of the monomers of a thiodicarboxylic acid ester of the formula:

$$R_3OOCR_1—S—R_2COOR_4$$

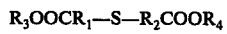

wherein $R_1$ and $R_2$ are each an alkylene group having 1 to 6 carbon atoms and $R_3$ and $R_4$ are each an alkyl group having 1 to 24 carbon atoms as a stabilizer and using an azo compound as a polymerization initiator.

2. The method according to claim 1, wherein $R_1$ and $R_2$ are each methylene, ethylene or propylene and $R_3$ and $R_4$ are each decyl, dodecyl, tetradecyl, hexadecyl or octadecyl.

3. The method according to claim 1, wherein the thiodicarboxylic acid ester is dilauryl thiodipropionate, distearyl thiodipropionate or lauryl stearyl thiodipropionate.

4. The method according to claim 1, wherein the amount of the thiodicarboxylic acid ester is from about 0.01 to 0.2% by weight.

5. The method according to claim 1, wherein the amount of the azo compound is from about 0.001 to 1.0% by weight based on the total amount of the monomers.

6. The method according to claim 1, wherein the partial polymerization is carried out at a temperature of from about 60° to 200° C.

7. The method according to claim 6, wherein the partial polymerization is carried out at a temperature of from about 80° to 180° C.

8. A casting syrup produced by the process of claim 1, the polymer content of the syrup being from 10 to 40% by weight and the viscosity of the syrup being from 1 to 100 poise.

9. A cast plate prepared from the casting syrup of claim 8.

* * * * *